United States Patent [19]

Aramaki

[11] Patent Number: 5,060,474
[45] Date of Patent: Oct. 29, 1991

[54] EXHAUST EMISSION CONTROL FAILURE DETECTION SYSTEM FOR INTERNAL COMBUSTION ENGINE

[75] Inventor: Takashi Aramaki, Kanagawa, Japan

[73] Assignee: Nissan Motor Company, Limited, Yokohama, Japan

[21] Appl. No.: 556,717

[22] Filed: Jul. 26, 1990

[30] Foreign Application Priority Data

Jul. 26, 1989 [JP] Japan ................................ 1-191523

[51] Int. Cl.$^5$ ................................................ F01N 3/28
[52] U.S. Cl. ........................................ 60/277; 60/290
[58] Field of Search .................. 60/274, 277, 289, 290

[56] References Cited

U.S. PATENT DOCUMENTS

| | | | |
|---|---|---|---|
| 3,969,932 | 7/1976 | Rieger | 60/277 |
| 4,729,220 | 3/1988 | Terasaka | 60/277 |

FOREIGN PATENT DOCUMENTS

| | | | |
|---|---|---|---|
| 236659 | 12/1986 | European Pat. Off. | 60/277 |
| 32947 | 3/1980 | Japan | 60/277 |

*Primary Examiner*—Douglas Hart
*Attorney, Agent, or Firm*—Foley & Lardner

[57] ABSTRACT

In an exhaust emission control system for an internal combustion engine, a secondary air is selectively introduced into an exhaust passage at a first position upstream of a catalytic converter. A failure detection system utilizes a plurality of temperatures of an exhaust gas for detecting a failure of the exhaust emission control system. A first temperature is derived at a second position between the first position and the catalytic converter when the secondary air is introduced into the exhaust passage at the first position. A second temperature is derived at the second position when no secondary air is introduced into the exhaust passage at the first position. By comparing the first and second temperature, it is detected whether the exhaust emission control system includes a failure. Third and fourth temperatures may also be derived at a third position located inside or downstream of the catalytic converter, which respectively correspond to the first and second temperatures. By comparing a difference between the first and third temperatures and a difference between the second and fourth temperatures, it is detected whether the exhaust emission control system includes a failure.

14 Claims, 8 Drawing Sheets

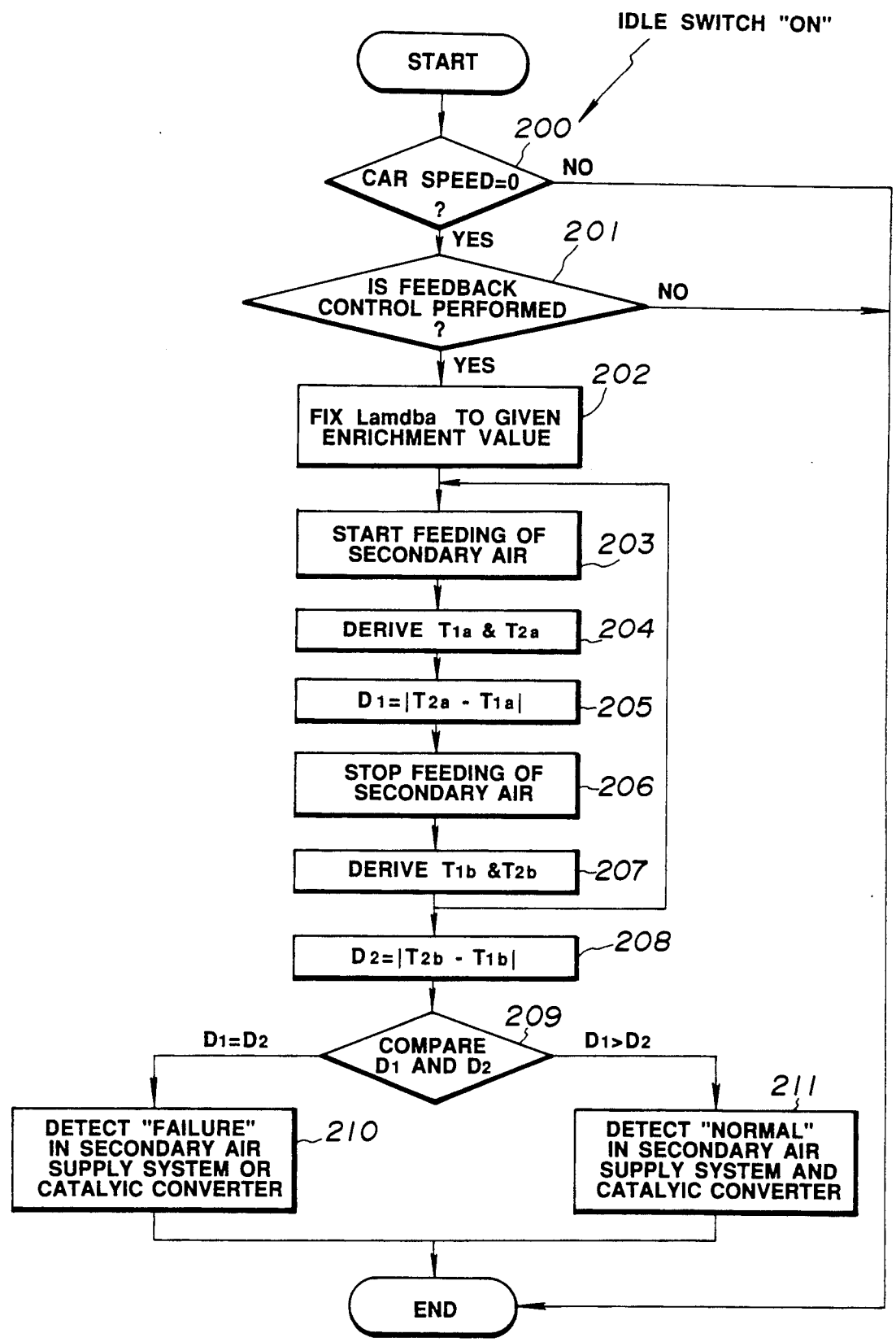

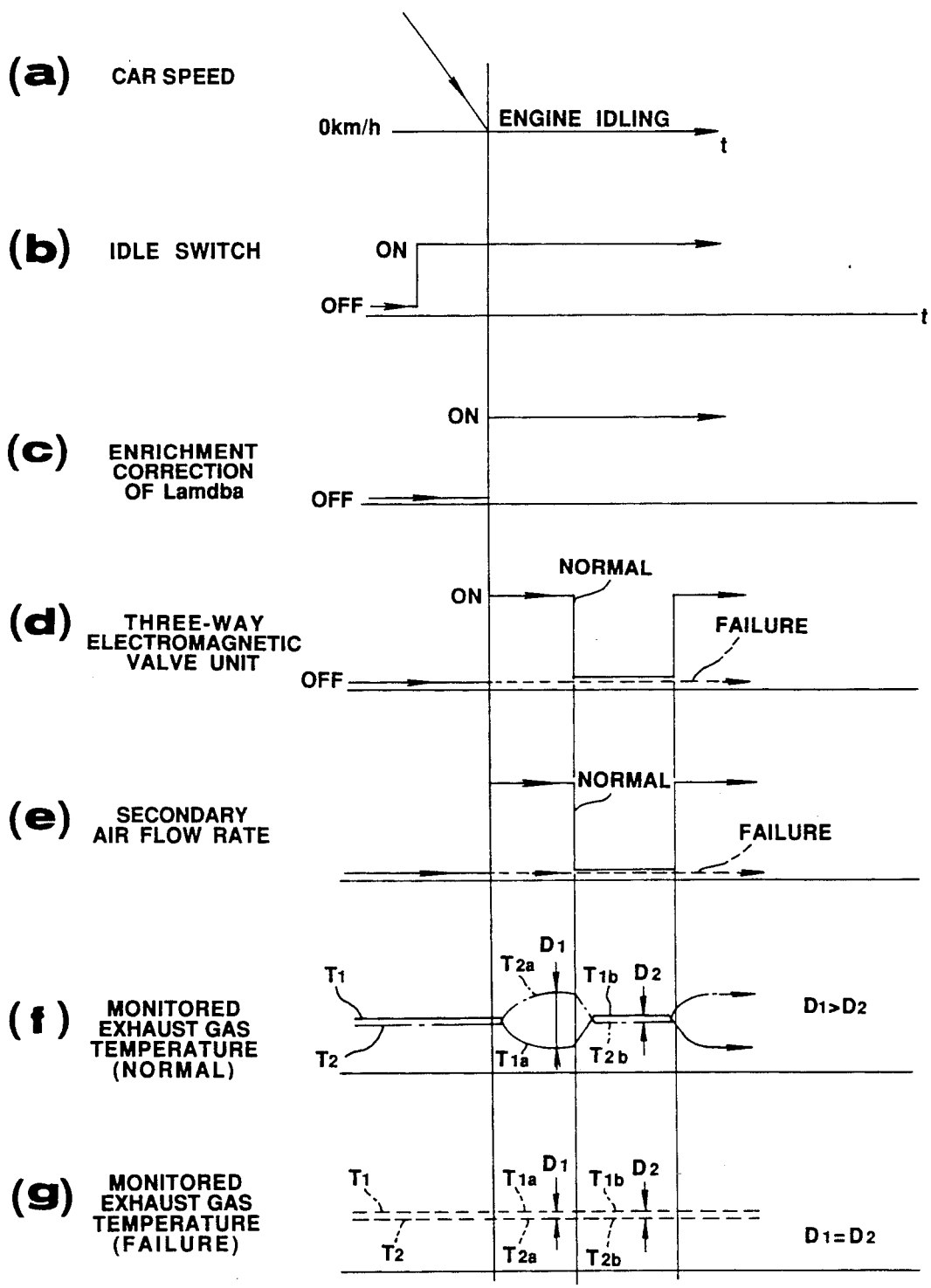

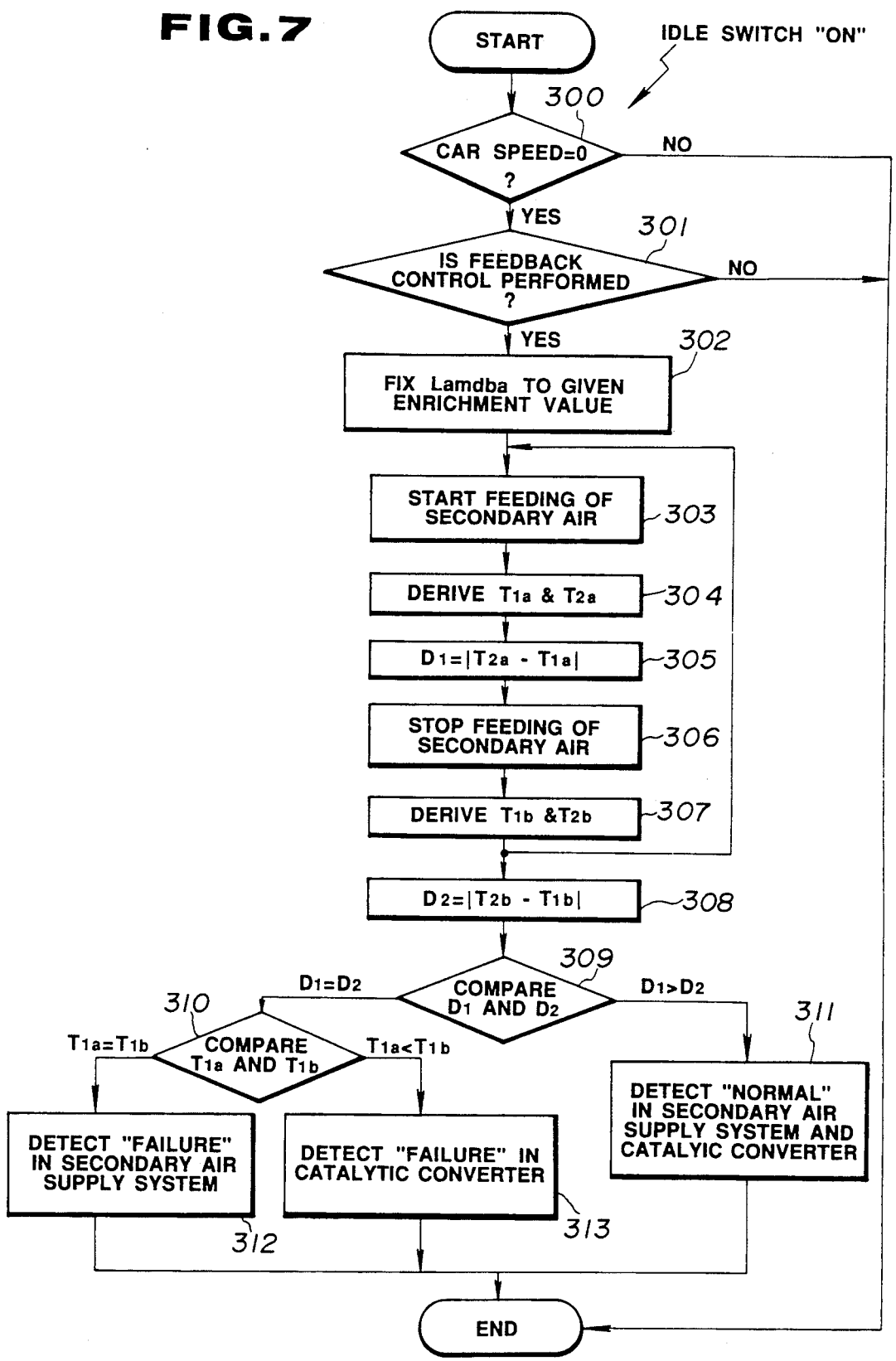

EXHAUST EMISSION CONTROL FAILURE DETECTION SYSTEM FOR INTERNAL COMBUSTION ENGINE

BACKGROUND OF THE INVENTION

1. Field of the Invention

The present invention relates generally to a failure detection system for an exhaust emission control system for use in an internal combustion engine. More specifically, the present invention relates to an exhaust emission control failure detection system for an internal combustion engine, which is capable of detecting failure or malfunction of the operation of the exhaust emission control system with high accuracy so as to enhance the reliability of the system.

2. Description of the Background Art

In a known exhaust emission control system for an internal combustion engine, a secondary air is introduced into an engine exhaust passage to be mixed with an exhaust gas so as to oxidize unburnt exhaust emission, such as, carbon monoxide (CO) and hydro carbon (HC) by means of a catalytic converter, such as, a catalytic converter rhodium (CCRO) disposed in the exhaust passage. The secondary air is introduced into the exhaust passage in a predetermined engine driving range where an enrichment correction of an air-fuel ratio of an air/fuel mixture is performed, such as, an engine start up enrichment correction, an acceleration enrichment correction and the like. This is because the exhaust gas includes a substantial amount of CO and HC during the enrichment correction of the air/fuel ratio being performed, and thus, the secondary air is supplied to the catalytic converter for oxidation of CO and HC.

Japanese First Patent publication (Tokkaisho) No. 63-165744 discloses a sensor for monitoring degradation of a catalyst used in a honeycomb type catalytic converter. In this publication, the sensor includes an elongate base coated with a catalyst which is the same as that coated on the honeycombed support of the catalytic converter. The sensor is inserted into a hole of the honeycombed support so as to indirectly monitor the degradation of the catalyst used in the catalytic converter.

However, the disclosed sensor is only applicable for monitoring the degradation of the catalytic converter, and thus, it is impossible to detect failure of the other components of the exhaust emission control system, such as, whether the secondary air is properly introduced into the exhaust gas.

SUMMARY OF THE INVENTION

Therefore, it is an object of the present invention to provide a failure detection system for an exhaust emission control system for use in an internal combustion engine that can eliminate the above-noted defects inherent in the background art.

It is another object of the present invention to provide a failure detection system for an exhaust emission control system for use in an internal combustion engine that can detect with high accuracy whether a secondary air is properly supplied into an exhaust gas upstream of a catalytic converter which is disposed in an engine exhaust passage.

It is a further object of the present invention to provide a failure detection system for an exhaust emission control system for use in an internal combustion engine that can detect with high accuracy whether a secondary air supply system or a catalytic converter includes a failure.

It is a still further object of the present invention to provide a failure detection system for an exhaust emission control system for use in an internal combustion engine that can detect which of a secondary air supply system and a catalytic converter includes a failure.

To accomplish the above-mentioned and other objects, according to one aspect of the present invention, in an exhaust emission control system for an internal combustion engine, the exhaust emission control system having:

exhaust passage means for conducting an exhaust gas discharged from an engine combustion chamber, the exhaust passage means including therein catalytic converter means; and secondary air supply means for selectively feeding a secondary air into the exhaust passage means at a first position upstream of the catalytic converter means;

a failure detection system comprises:

first means for controlling the secondary air supply means to feed the secondary air into the exhaust passage at the first position;

second means for deriving a first temperature of the exhaust gas at a second position downstream of the first position when the secondary air is fed by the first means;

third means for controlling the secondary air supply means to stop feeding of the secondary air into the exhaust passage at the first position;

fourth means for deriving a second temperature of the exhaust gas at the second position when the feeding of the secondary air is stopped by the third means;

fifth means for deciding whether the exhaust emission control system includes a failure, based on the first temperature and the second temperature.

According to another aspect of the present invention, in an exhaust emission control system for an internal combustion engine, the exhaust emission control system having:

exhaust passage means for conducting an exhaust gas discharged from an engine combustion chamber, the exhaust passage means including therein catalytic converter means; and secondary air supply means for selectively feeding a secondary air into the exhaust passage means at a first position upstream of the catalytic converter means;

a failure detection system comprises:

first means for controlling the secondary air supply means to feed the secondary air into the exhaust passage at the first position;

second means for deriving a first temperature of the exhaust gas at a second position between the first position and the catalytic converter means when the secondary air is fed by the first means;

third means for deriving a second temperature of the exhaust gas at a third position located inside or downstream of the catalytic converter means when the secondary air is fed by the first means;

fourth means for deriving a first difference between the first and second temperatures;

fifth means for controlling the secondary air supply means to stop feeding of the secondary air into the exhaust passage at said first position;

sixth means for deriving a third temperature of the exhaust gas at the second position when the feeding of the secondary air is stopped by the fifth means;

seventh means for deriving a fourth temperature of the exhaust gas at the third position when the feeding of the secondary air is stopped by the fifth means;

eight means for deriving a second difference between the third and fourth temperatures;

ninth means for deciding whether the exhaust emission control system includes a failure, based on the first difference and the second difference.

The ninth means may compare the first and third temperatures when the first difference is equal to the second difference, the ninth means deciding that the secondary air supply means includes the failure when the first temperature is equal to the third temperature, while, deciding that the catalytic converter means includes the failure when the first temperature is less than the third temperature.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIG. 5 shows a flowchart of a failure detection routine to be executed by a control unit for detecting a failure of the exhaust emission control system, according to the second preferred embodiment;

FIGS. 6 (a) to (g) respectively show time charts for explaining timing relationship among associated factors; and FIG. 7 shows a flowchart of a failure detection routine to be executed by a control unit for detecting a failure of the exhaust emission control system, according to a third preferred embodiment.

DESCRIPTION OF THE PREFERRED EMBODIMENT

Figure 1:
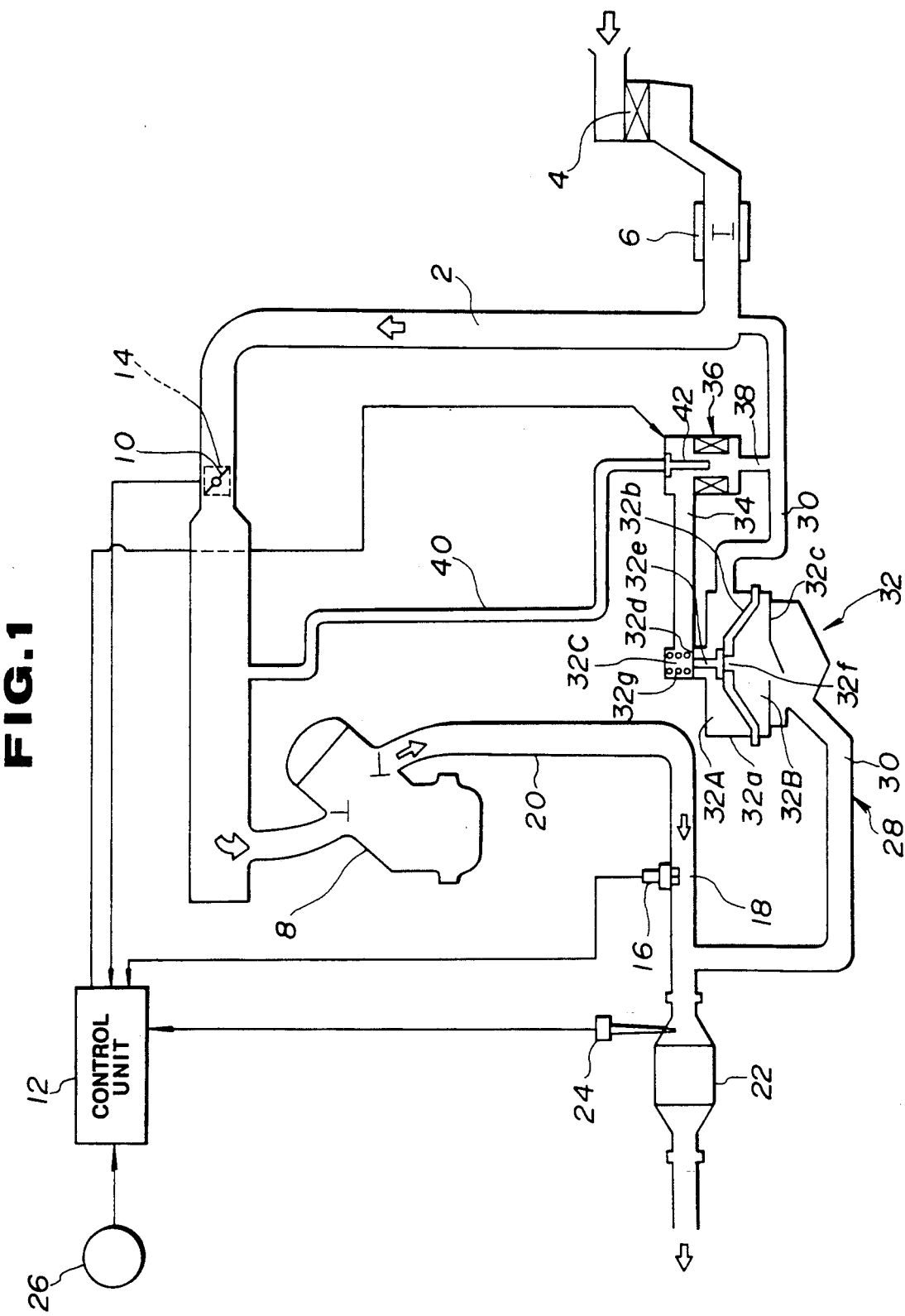
FIG. 1 is a schematic diagram showing an overall structure of an exhaust emission control system for use in an internal combustion engine, including a failure detection system according to a first preferred embodiment of the present invention.

Referring now to the drawings, first to third preferred embodiments of a failure detection system for an exhaust emission control system for use in an internal combution engine according to the present invention will be described with reference to FIGS. 1 to 7.

Figure 2A:
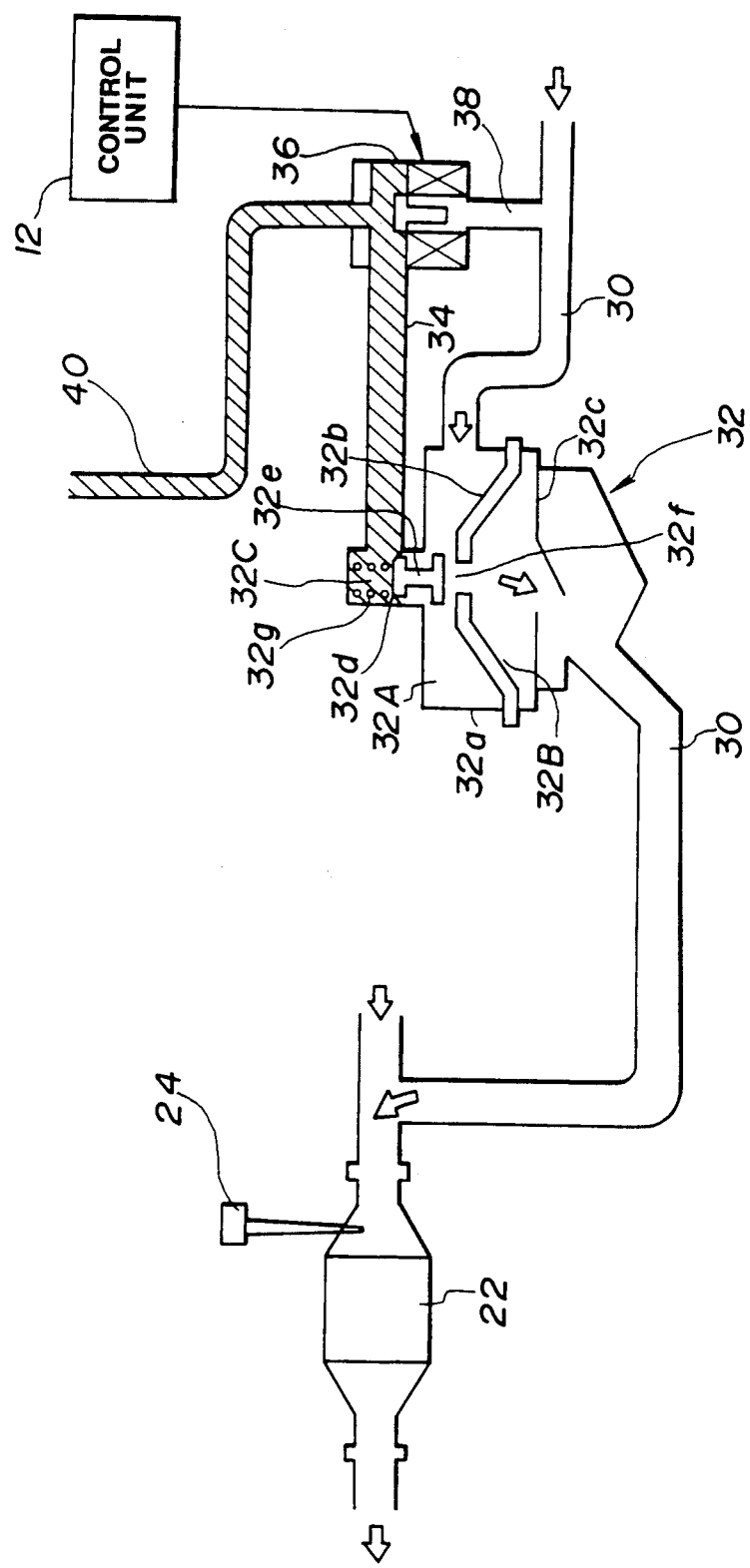
FIG. 2(a) is a partial schematic view of FIG. 1 showing a condition where feeding of a secondary air is performed.
Figure 2B:
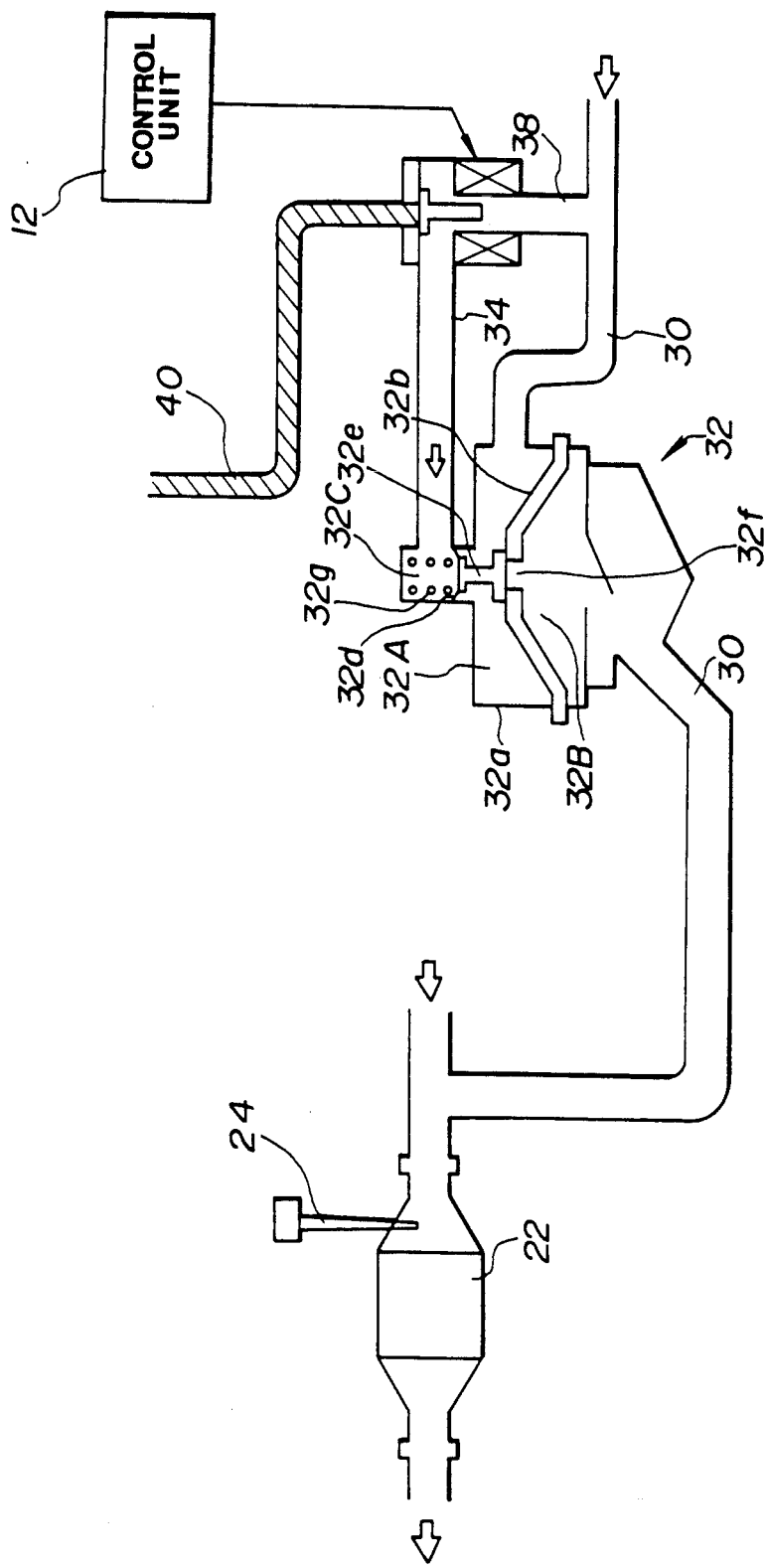
FIG. 2(b) is a partial schematic view of FIG. 1 showing a condition where feeding of a secondary air is interrupted.
Figure 3:
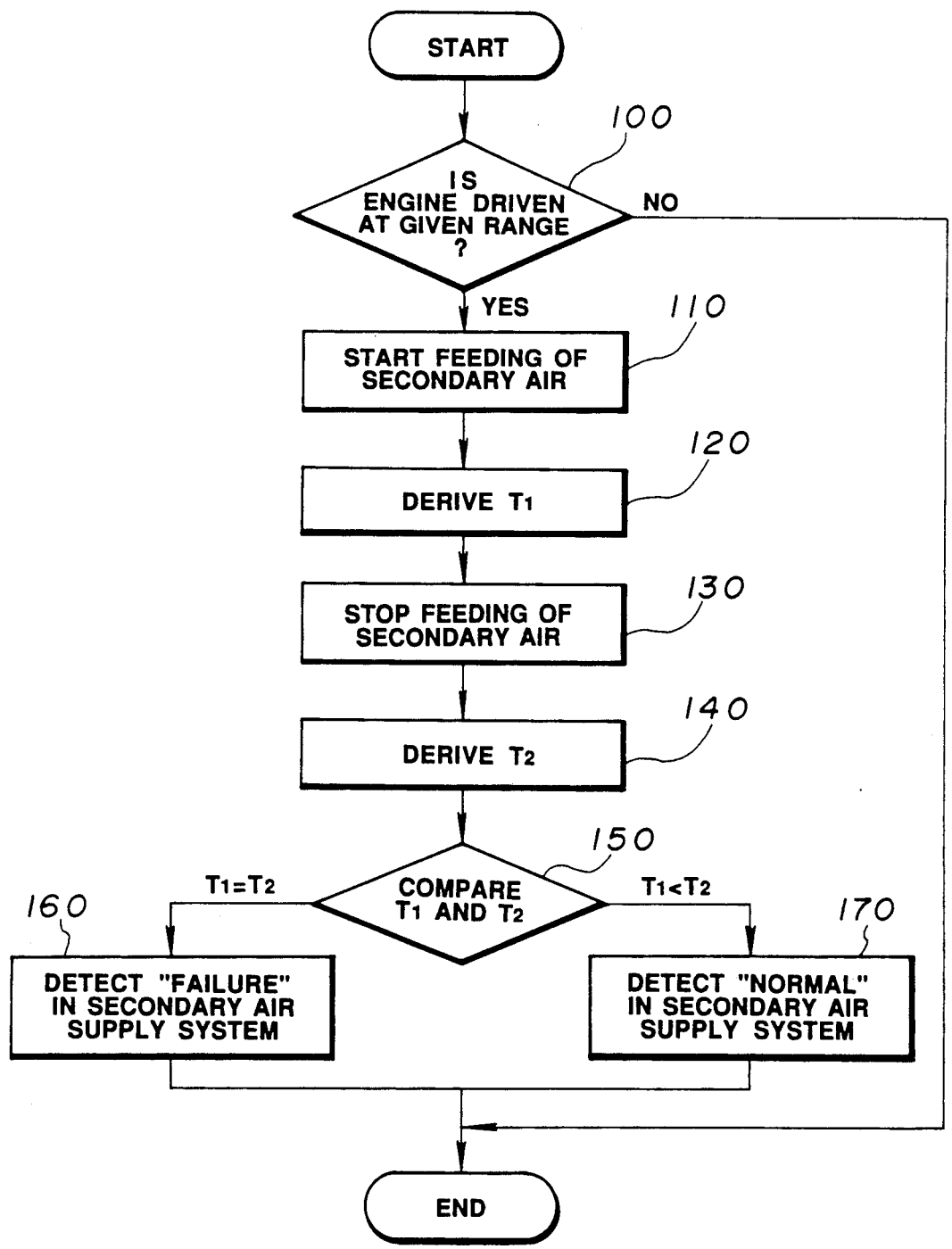
FIG. 3 shows a flowchart of a failure detection routine to be executed by a control unit for detecting a failure of the exhaust emission control system, according to the first preferred embodiment.

FIGS. 1 to 3 show the first preferred embodiment of the failure detection system. In FIG. 1, air is introduced into an induction passage 2 through an air cleaner 4. An air-flow meter 6 is provided in the induction passage 2 for monitoring an intake air flow rate passing therethrough toward engine combustion chambers 8 through a throttle valve 10 and producing a signal indicative thereof which is fed to a control unit 12. The control unit 12 includes a microcomputer having CPU, RAM, ROM and an input/output circuit as in the known way. The throttle valve 10 is interconnected with an accelerator pedal so as to adjust the intake air flow rate passing therethrough according to an accelerator pedal position. An angular position of the throttle valve 10 is monitored by a throttle position sensor 14 which detects a fully closed position of the throttle valve when an idle switch is ON. The throttle position sensor 14 produces a signal indicative of a monitored throttle valve angular position which is fed to the control unit 12.

An oxygen sensor 16 is provided in an exhaust passage 18 at a portion downstream of an exhaust manifold 20 for monitoring oxygen concentration contained in an exhaust gas passing through the exhaust passage 18 to produce a signal indicative of the monitored oxygen concentration. The oxygen concentration indicative signal is fed to the control unit 12 for performing a FEEDBACK or CLOSED LOOP control of a fuel injection amount to maintain an air/fuel ratio of an air/fuel mixture at a stoichiometric value in a predetermined engine driving range.

A catalytic converter rhodium 22 is provided in the exhaust passage 18 downstream of the oxygen sensor 16 for purifying the exhaust emission, including oxidation of CO and HC. An exhaust gas temperature sensor 24 is further provided in the exhaust passage 18 between the oxygen sensor 16 and the catalytic converter rhodium 22 for monitoring a temperature of the exhaust gas passing therethrough to produce a signal indicative thereof which is fed to the control unit 12. The control unit 12 is further fed with various signals indicative of respective engine operation parameters, including a signal indicative of an actual car speed monitored by a car speed sensor 26.

A secondary air supply system generally designated by a reference numeral 28 is provided between the induction passage 2 and the exhaust passage 18 for conducting a controlled amount of an atmospheric air from the induction passage 2 into the exhaust passage 18 at a portion downstream of the oxygen sensor 16 and upstream of the catalytic converter 22 and the exhaust gas temperature sensor 24.

Specifically, the secondary air supply system 28 includes a secondary air feeding passage 30 which is open at its one end to the induction passage 2 at a portion just downstream of the air flow meter 6 and at is other end to the exhaust passage 18 at a portion between the oxygen sensor 16 and the exhaust gas temperature sensor 24. A control valve unit 32 is provided in the secondary air feeding passage 30 to establish or interrupt communication between the induction passage 2 and the exhaust passage 18 for controlling the feeding of the secondary air into the exhaust passage 18.

The control valve unit 32 includes a casing 32a which is divided into a first chamber 32A and a second chamber 32B by a partition 32b. A lead valve 32c is arranged in the second chamber 32B, which is actuated to open or close depending on a pulsation pressure of the exhaust gas applied thereto from the exhaust passage 18 via the downstream side of the secondary air feeding passage 30. Specifically, when a vacuum portion of the pulsation pressure is applied to the lead valve 32c, the lead valve 32c is opened, which is closed otherwise. At one end of the first chamber 32A remote from the other end adjacent to the second chamber 32B, a diaphragm 32d is provided to define a pressure chamber 32C. The diaphragm 32d is attached with a valve 32e which opens or closes a communication opening 32f formed at the center of the partition 32b according to a displacement of the diaphragm 32d. When no pressure differential exists between at the first chamber 32A and the pressure chamber 32C, the valve 32e closes the communication opening 32f urged by a force of a coil spring 32g disposed in the pressure chamber 32C.

The secondary air supply system 28 further includes a first passage 34 which is communicated with the pressure chamber 32C at its one end and with a three-way electromagnetic valve unit 36 at its other end. A second passage 38 is further provided which connects the three-way electromagnetic valve unit 36 to the secondary air feeding passage 30 at a portion upstream of the control valve unit 32. The three-way electromagnetic valve unit 36 is further connected via a third passage 40 with the induction passage 2 at a portion downstream of the throttle valve 10.

When the three-way electromagnetic valve unit 36 is excited or magnetized, a spool valve 42 is moved downward as shown in FIG. 2(a) to establish communication between the first passage 34 and the third passage 40. Accordingly, a vacuum is introduced into the pressure chamber 32C from the induction passage 2 downstream of the throttle valve 10 to displace the diaphragm 32d upward as shown in FIG. 2(a) since the atmospheric air is introduced into the first chamber 32A through the secondary air feeding passage 30. As a result, the valve 32e is moved upward to establish communication between the induction passage 2 and the exhaust passage 18 via the secondary air feeding passage 30 so as to introduce the air into the exhaust passage 18 depending on an open/closed position of the lead valve 32c.

On the other hand, when the three-way electromagnetic valve unit 36 is de-energized, the spool valve 42 is moved upward as shown in FIG. 2(b) to establish communication between the first passage 34 and the second passage 38. Accordingly, the atmospheric air is introduced both into the pressure chamber 32C and the first chamber 32A so that the diaphragm 32d is moved downward as shown in FIG. 2(b) by the spring force of the coil spring 32g. As a result, the valve 32e closes the center communication opening 32f to interrupt communication between the induction passage 2 and the exhaust passage 18 via the secondary air feeding passage 30 so as to feed no secondary air into the exhaust passage 18 via the secondary air feeding passage 30.

The operation of the three-way electromagentic valve unit 36 is controlled by a signal fed from the control unit 12. At a normal operation of the exhaust emission control system, the control unit 12 energizes the three-way electromagnetic valve unit 36 to feed the secondary air into the exhaust passage 18 when an enrichment correction of the air/fuel ratio is performed.

Now, an operation of the failure detection system according to the first preferred embodiment will be described hereinbelow with reference to FIG. 3 which shows a flowchart of a failure detection routine to be executed by the control unit 12 for detecting the failure of the exhaust emission control system. The failure detection routine is executed per a predetermined unit time.

At a first step 100, it is decided whether it is a predetermined engine driving range which satisfies a condition for executing the failure detection routine. A stable engine driving range, such as, an engine idling, may be the predetermined engine driving range. If a decision at the step 100 is NO, then subsequent steps are not executed. On the other hand, if the decision at the step 100 is YES, then the routine goes to a step 110 where the three-way electromagnetic valve unit 36 is energized to start feeding of the secondary air into the exhaust passage 18.

Subsequently, the routine goes to a step 120 where an exhaust gas temperature $T_1$ is derived based on an exhaust gas temperature indicative signal from the exhaust gas temperature sensor 24. At a subsequent step 130, the three-way electromagnetic valve unit 36 is de-energized to stop feeding of the secondary air into the exhaust passage 18. Subsequently, at a step 140, an exhaust gas temperature $T_2$ is derived based on an exhaust gas temperature indicative signal from the exhaust gas temperature sensor 24.

Then, the routine goes to a step 150 where the exhaust gas temperature $T_1$ derived at the step 120 and the exhaust gas temperature $T_2$ derived at the step 140 are compared. If it is decided that the temperatures $T_1$ and $T_2$ are equal, then the routine goes to a step 160 where it is detected that the secondary air supply system malfunctions, i.e. the failure of the exhaust emission control system is detected. On the other hand, if it is decided that the temperature $T_1$ is less than the temperature $T_2$, then the routine goes to a step 170 where it is decided that the secondary air supply system functions normally.

Specifically, when the secondary air is fed into the exhaust passage 18 upstream of the exhaust gas temperature sensor 24, the temperature of the exhaust gas monitored at the exhaust gas temperature sensor 24 becomes lower than that of the exhaust gas including no secondary air. Accordingly, when the temperature $T_1$ of the exhaust gas which should include the secondary air is equal to the temperature $T_2$ of the exhaust gas which should include no secondary air, it can be decided that the secondary air supply system includes the failure. On the other hand, when the temperature $T_1$ is less than the temperature $T_2$, then it can be decided that the secondary air supply system includes no failure.

It is preferable to provide visual or sound information for a driver to notice the detection of the failure in the exhaust emission control system.

Now, the failure detection system according to the second preferred embodiment will be described hereinbelow with reference to FIGS. 4 to 6.

Figure 4:
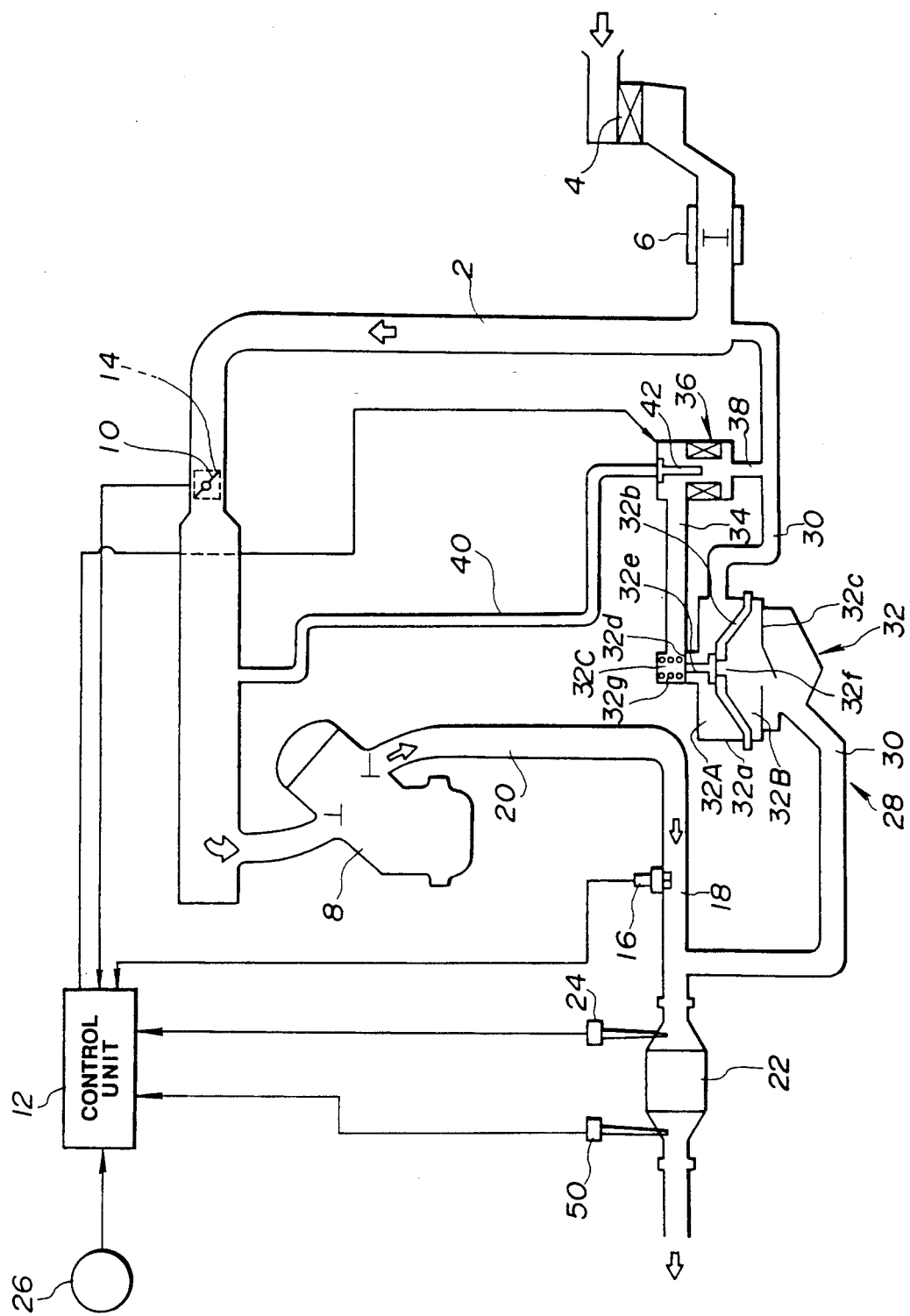
FIG. 4 is a schematic diagram showing an overall structure of an exhaust emission control system including a failure detection system according to a second preferred embodiment of the present invention.

In FIG. 4, the same elements are designated by the same reference numerals as in FIG. 1 to omit explanation thereof so as to avoid a redundant disclosure. The structure shown in FIG. 4 is substantially the same as that shown in FIG. 1 except for an additional exhaust gas temperature sensor 50 provided inside or at an outlet of the catalytic converter 22. Accordingly, in the second preferred embodiment, a pair of the exhaust gas temperature sensors 24 and 50 are provided in the exhaust passage 18. It is preferable that the exhaust gas temperature sensor 24 is provided at an inlet of the catalytic converter 22.

FIG. 5 shows a flowchart of a failure detection routine according to the second preferred embodiment, which is executed by the control unit 12 for detecting the failure of the exhaust emission control system. The execution of the failure detection routine is triggered when the throttle position sensor 14 detects the fully closed position of the throttle valve 10, i.e. when the idle switch gets ON and is terminated when the idle switch gets OFF.

At a first step 200, it is decided whether an actual car speed is zero, i.e. whether the car is stopped, based on a signal from the car speed sensor 26. If a decision at the step 200 is NO, then subsequent steps are not executed in order to avoid the execution of the failure detection routine under an unstable engine driving range. Since this failure detection routine is triggered when the idle switch gets ON, the execution of the step 200 detects an engine idling when the decision thereat is YES.

It is to be appreciated that this failure detection routine may also be executed at a given stable engine driving range other than the engine idling.

If the decision at the step 200 is YES, then the routine proceeds to a step 201 where it is decided whether the FEEDBACK control of the air/fuel ratio is performed. As is known in the art, the FEEDBACK control of the air/fuel ratio is performed in a given stable engine driving range to maintain the air/fuel ratio at the stoichiometric value, using a variable correction coefficient $L_{ambda}$ which is derived based on an oxygen concentration indicative signal from the oxygen sensor 16. If a decision at the step 201 is NO, then subsequent steps are not executed. On the other hand, if the decision at the step 201 is YES, then the routine goes to a step 202 where the correction coefficient $L_{ambda}$ is fixed to a given enrichment correction value, which will be described later.

Subsequently, the routine proceeds to a step 203 where the three-way electromagnetic valve unit 36 is energized to start feeding of the secondary air into the exhaust passage 18. At a subsequent step 204, an exhaust gas temperature $T_{1a}$ is derived based on an exhaust gas temperature indicative signal from the exhaust gas temperature sensor 24, and an exhaust gas temperature $T_{2a}$ is derived based on an exhaust gas temperature indicative signal from the exhaust gas temperature sensor 50.

Subsequently, at a step 205, a difference $D_1$ between $T_{1a}$ and $T_{2a}$ is derived based on an equation $D_1 = |T_{2a} - T_{1a}|$.

Then, the routine proceeds to a step 206 where the three-way electromagnetic valve unit 36 is de-energized to stop feeding of the secondary air into the exhaust passage 18. Subsequently, at a step 207, an exhaust gas temperature $T_{1b}$ is derived based on an exhaust gas temperature indicative signal from the exhaust gas temperature sensor 24, and an exhaust gas temperature $T_{2b}$ is derived based on an exhaust gas temperature indicative signal from the exhaust gas temperature sensor 50.

After the exhaust gas temperatures $T_{1b}$ and $T_{2b}$ are derived at the step 207, the routine proceeds to a subsequent step 208 where a difference $D_2$ is derived based on an equation $D_2 = |T_{2b} - T_{1b}|$. The routine also returns to repeat the steps 203 to 207 sequentially and to proceed to the step 208 sequentially.

Subsequently, the routine proceeds to a step 209 where the difference $D_1$ derived at the step 205 and the difference $D_2$ derived at the step 209 are compared. If it is decided that $D_1$ is equal to $D_2$, then the routine goes to a step 210 where it is detected that the secondary air supply system or the catalytic converter 22 includes a failure, i.e. the failure of the exhaust emission control system is detected. On the other hand, if it is decided at the step 209 that $D_1$ is larger than $D_2$, then the routine goes to a step 211 where it is detected that both the secondary air supply system and the catalytic converter 22 function normally.

Specifically, since the correction coefficient $L_{ambda}$ is fixed to the given enrichment correction value at the step 202, a substantial amount of unburnt CO and HC is contained in the exhaust gas discharged from the engine combustion chambers 8. When the secondary air is introduced into the exhaust passage 18 at the step 203 to be mixed with the exhaust gas, these unburnt CO and HC are fully oxidized through the catalytic converter 22 using oxygen contained in the supplied secondary air. Accordingly, the heat is generated at the catalytic converter 22 due to the oxidation of CO and HC. As a result, the temperature $T_{2a}$ of the exhaust gas inside or at the outlet of the catalytic converter 22 should become higher than the temperature $T_{1a}$ of the exhaust gas at the inlet of the catalytic converter 22. On the other hand, when the feeding of the secondary air is stopped at the step 206, since no substantial heat is generated at the catalytic converter 22 due to extremely less oxidation of CO and HC, the difference $D_2$ ($|T_{2b} - T_{1b}|$) should be much less than the difference $D_1$ (51 $T_{2a}$ - $T_{1a}$|). Accordingly, if it is decided at the step 209 that $D_1$ is equal to $D_2$, it can be detected that the secondary air supply system or the catalytic converter is failed to function normally. On the other hand, if it is decided at the step 209 that $D_1$ is larger than $D_2$, then it can be detected that both the secondary air supply system and the catalytic converter function normally.

For better understanding of the above-described second preferred embodiment, FIGS. 6 (a) to (g) respectively show time charts for explaining timing relationship among the car speed (FIG. 6 (a)), the operation of the idle switch (FIG. 6 (b)), the enrichment correction of $L_{ambda}$ (FIG. 6 (c)), the operation of the three-way electromagnetic valve unit (FIG. 6 (d)), a secondary air flow rate (FIG. 6 (e)), monitored exhaust gas temperatures $T_{1a}$, $T_{1b}$, $T_{2a}$ and $T_{2b}$ (FIG. 6(f)) when the exhaust emission control system works normally, i.e. both the secondary air supply system and the catalytic converter rhodium work normally, and monitored exhaust gas temperatures $T_{1a}$, $T_{1b}$, $T_{2a}$ and $T_{2b}$ (FIG. 6(g)) when the exhaust emission control system fails to work normally, i.e. the secondary air supply system or the catalytic converter rhodium includes the failure.

Now, a third preferred embodiment will be described hereinbelow with reference to FIG. 7 which shows a flowchart of a failure detection routine to be executed by the control unit 12 for detecting the failure of the exhaust emission control system. In the third preferred embodiment, the structural elements are the same as those in FIG. 4 of the second preferred embodiment.

In FIG. 7, since steps 300 to 309 and 311 are the same as the steps 200 to 209 and 211 in FIG. 5, respectively, explanation thereof is omitted to avoid a redundant disclosure.

If it is decided at the step 309 that $D_1$ is equal to $D_2$, then the routine goes to a step 310 where $T_{1a}$ and $T_{1b}$ are compared. If it is decided that $T_{1a}$ is equal to $T_{1b}$, then the routine goes to a subsequent step 312 where a failure of the secondary air supply system is detected. On the other hand, if it is decided that $T_{1a}$ is less than $T_{1b}$, then the routine goes to a step 313 where a failure of the catalytic converter rhodium is detected.

As appreciated from the above description, in the third preferred embodiment, the failure detection system is capable of detecting which of the secondary air supply system and the catalytic conveter is failed to function normally.

What is claimed is:

1. In an exhaust emission control system for an internal combustion engine, said exhaust emission control system having:
   exhaust passage means for conducting an exhaust gas discharged from an engine combustion chamber, said exhaust passage means including therein catalytic converter means; and
   secondary air supply means for selectively feeding a secondary air into said exhaust passage means at a first position upstream of said catalytic converter means;
   a failure detection system comprising:
   first means for controlling said secondary air supply means to feed said secondary air into said exhaust passage at said first position;
   second means for deriving a first temperature of the exhaust gas at a second position downstream of said first position when said secondary air is fed by said first means;
   third means for controlling said secondary air supply means to stop feeding of said secondary air into said exhaust passage at said first position;
   fourth means for deriving a second temperature of the exhaust gas at said second position when the feeding of said secondary air is stopped by said third means;
   fifth means for deciding whether said exhaust emission control system includes a failure, based on said first temperature and said second temperature.

2. The failure detection system as set forth in claim 1, wherein said second position is upstream of said catalytic converter means, and said fifth means decides based on said first and second temperatures whether said secondary air supply means includes the failure.

3. The failure detection system as set forth in claim 2, wherein said fifth means decides that said secondary air supply means includes the failure when said first temperature is equal to said second temperature.

4. The failure detection system as set forth in claim 1, further comprising sixth means for deciding whether the engine is driven at a predetermined driving range.

5. In an exhaust emission control system for an internal combustion engine, said exhaust emission control system having:
   exhaust passage means for conducting an exhaust gas discharged from an engine combustion chamber, said exhaust passage means including therein catalytic converter means; and
   secondary air supply means for selectively feeding a secondary air into said exhaust passage means at a first position upstream of said catalytic converter means;
   a failure detection system comprising:
   first means for controlling said secondary air supply means to feed said secondary air into said exhaust passage at said first position;
   second means for deriving a first temperature of the exhaust gas at a second position between said first position and said catalytic converter means when said secondary air is fed by said first means;
   third means for deriving a second temperature of the exhaust gas at a third position located inside or downstream of said catalytic converter means when said secondary air is fed by said first means;
   fourth means for deriving a first difference between said first and second temperatures;
   fifth means for controlling said secondary air supply means to stop feeding of said secondary air into said exhaust passage at said first position;
   sixth means for deriving a third temperature of the exhaust gas at said second position when the feeding of said secondary air is stopped by said fifth means;
   seventh means for deriving a fourth temperature of the exhaust gas at said third position when the feeding of said secondary air is stopped by said fifth means;
   eight means for deriving a second difference between said third and fourth temperatures:
   ninth means for deciding whether said exhaust emission control system includes a failure, based on said first difference and said second difference.

6. The failure detection system as set forth in claim 5, wherein said third position is located at an outlet of said catalytic converter means.

7. The failure detection system as set forth in claim 5, wherein said second position is located at an inlet of said catalytic converter means.

8. The failure detection system as set forth in claim 5, wherein said ninth means decides that said exhaust emission control system includes the failure when said first difference is equal to said second difference.

9. The failure detection system as set forth in claim 5, further comprising tenth means for deciding whether the engine is driven at a predetermined driving range.

10. The failure detection system as set forth in claim 9, wherein said predetermined driving range is an engine idling, 11. The failure detection system as set forth in claim 10, further comprising eleventh means for deciding whether a FEEDBACK control of an air/fuel ratio of an air/fuel mixture is performed.

12. The failure detection system as set forth in claim 11, further comprising twelfth means for fixing a FEEDBACK correction value to a predetermined enrichment correction value.

13. The failure detection system as set forth in claim 5, wherein said ninth means compares said first and second differences to decide that the exhaust emission control system includes no failure when said first difference is larger than said second difference.

14. The failure detection system as set forth in claim 13, wherein said ninth means compares said first and third temperatures when said first difference is equal to said second difference, said ninth means deciding that said secondary air supply means includes the failure when said first temperature is equal to said third temperature, while, deciding that said catalytic converter means includes the failure when said first temperature is less than said third temperature.

* * * * *